US011089026B2

(12) United States Patent
Singh

(10) Patent No.: US 11,089,026 B2
(45) Date of Patent: Aug. 10, 2021

(54) MANAGING ACCESS CREDENTIALS FOR A SERVICE PROVIDER

(71) Applicant: salesforce.com, inc., San Francisco, CA (US)

(72) Inventor: Prabhjot Singh, Union City, CA (US)

(73) Assignee: salesforce.com, inc., San Francisco, CA (US)

( * ) Notice: Subject to any disclaimer, the term of this patent is extended or adjusted under 35 U.S.C. 154(b) by 376 days.

(21) Appl. No.: 16/058,815

(22) Filed: Aug. 8, 2018

(65) Prior Publication Data

US 2020/0053089 A1 Feb. 13, 2020

(51) Int. Cl.
*H04L 29/06* (2006.01)
*G06F 21/33* (2013.01)
*G06F 21/46* (2013.01)
*H04L 9/32* (2006.01)
*G06F 21/62* (2013.01)

(52) U.S. Cl.
CPC .......... *H04L 63/102* (2013.01); *G06F 21/335* (2013.01); *G06F 21/46* (2013.01); *G06F 21/6218* (2013.01); *H04L 9/3213* (2013.01); *H04L 63/08* (2013.01); *G06F 2221/2115* (2013.01)

(58) Field of Classification Search
None
See application file for complete search history.

(56) References Cited

U.S. PATENT DOCUMENTS

| 7,730,478 | B2 | 6/2010 | Weissman |
| 7,779,039 | B2 | 8/2010 | Weissman et al. |
| 9,544,287 | B1* | 1/2017 | Sokolov ............... H04L 63/0884 |
| 10,778,691 | B1* | 9/2020 | Kissell .................. H04L 63/104 |

(Continued)

OTHER PUBLICATIONS

Tykkyläinen, Joona. "Configurable integrations with 3rd party identityproviders in a multi-tenant SaaS application.", Aalto University, 2016, p. 1-77. (Year: 2016).*

*Primary Examiner* — Jeffery L Williams
(74) *Attorney, Agent, or Firm* — Haynes and Boone, LLP

(57) ABSTRACT

A computing device includes a memory and one or more processors coupled to the memory. The memory contains machine readable medium storing machine executable code which, when executed by the one or more processors, cause the one or more processors to: identify a service provider providing services or information to at least one of a plurality of organizations having access to a multi-tenant database system provided by a first party; establish an account for the service provider at a hosted service system, the hosted service system provided by a third party that is different from the first party providing the multi-tenant database system, the account for maintaining access credentials for the at least one of the plurality of organizations to the service provider's services or information, wherein the access credentials are not maintained at the multi-tenant database system; and using the credentials, authenticate the at least one of a plurality of organizations for access to the service provider's services or information through the multi-tenant database system. In some embodiments, the one or more processors create login credentials for the account and transmit the login credentials to the service provider so that the service provider may access the account.

21 Claims, 6 Drawing Sheets

(56) References Cited

U.S. PATENT DOCUMENTS

| | | | |
|---|---|---|---|
| 2011/0231919 A1* | 9/2011 | Vangpat | G06F 21/31 |
| | | | 726/8 |
| 2012/0096521 A1* | 4/2012 | Peddada | G06F 21/629 |
| | | | 726/4 |
| 2013/0091171 A1* | 4/2013 | Lee | G06F 21/41 |
| | | | 707/784 |
| 2016/0344719 A1* | 11/2016 | Simone | H04L 63/10 |
| 2017/0228391 A1 | 8/2017 | Salva et al. | |
| 2017/0344481 A1* | 11/2017 | Pack, III | G06F 16/00 |
| 2017/0353444 A1* | 12/2017 | Karangutkar | H04W 12/0602 |
| 2018/0139109 A1* | 5/2018 | Zuerner | H04L 41/5051 |
| 2019/0155938 A1 | 5/2019 | Kudriavtsev et al. | |
| 2019/0215320 A1* | 7/2019 | Alzate | H04L 63/0846 |
| 2019/0230081 A1 | 7/2019 | Singh et al. | |
| 2019/0230169 A1 | 7/2019 | Elangovan et al. | |
| 2019/0384922 A1* | 12/2019 | Jamkhedkar | G06F 21/604 |
| 2020/0053089 A1* | 2/2020 | Singh | G06F 21/335 |
| 2020/0294008 A1* | 9/2020 | Jamkhedkar | G06Q 20/027 |
| 2020/0296143 A1* | 9/2020 | Mohamad Abdul | |
| | | | H04L 63/0807 |

* cited by examiner

MANAGING ACCESS CREDENTIALS FOR A SERVICE PROVIDER

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present disclosure relates generally to database systems, and more specifically to a system and method for managing and using access credentials for a service provider.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art.

Computer and software development is evolving away from the client-server model toward network-based processing systems that provide access to data and services via the Internet or other networks. In contrast to traditional systems that host networked applications on dedicated server hardware, a "cloud" computing model allows applications to be provided over the network "as a service" supplied by an infrastructure provider. The infrastructure provider typically abstracts the underlying hardware and other resources used to deliver a user-developed application so that a user (e.g., consumer of cloud-based services) no longer needs to operate and support dedicated server hardware. The cloud computing model can often provide substantial cost savings to the user over the life of the application because the user no longer needs to provide dedicated network infrastructure, electrical and temperature controls, physical security and other logistics in support of dedicated server hardware.

A cloud platform (i.e., a computing platform for cloud computing) may be employed by many users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.). In one example, the cloud platform may support customer relationship management (CRM) solutions. This may include support for sales, service, marketing, community, analytics, applications, and the Internet of Things (IoT).

Figure 1:
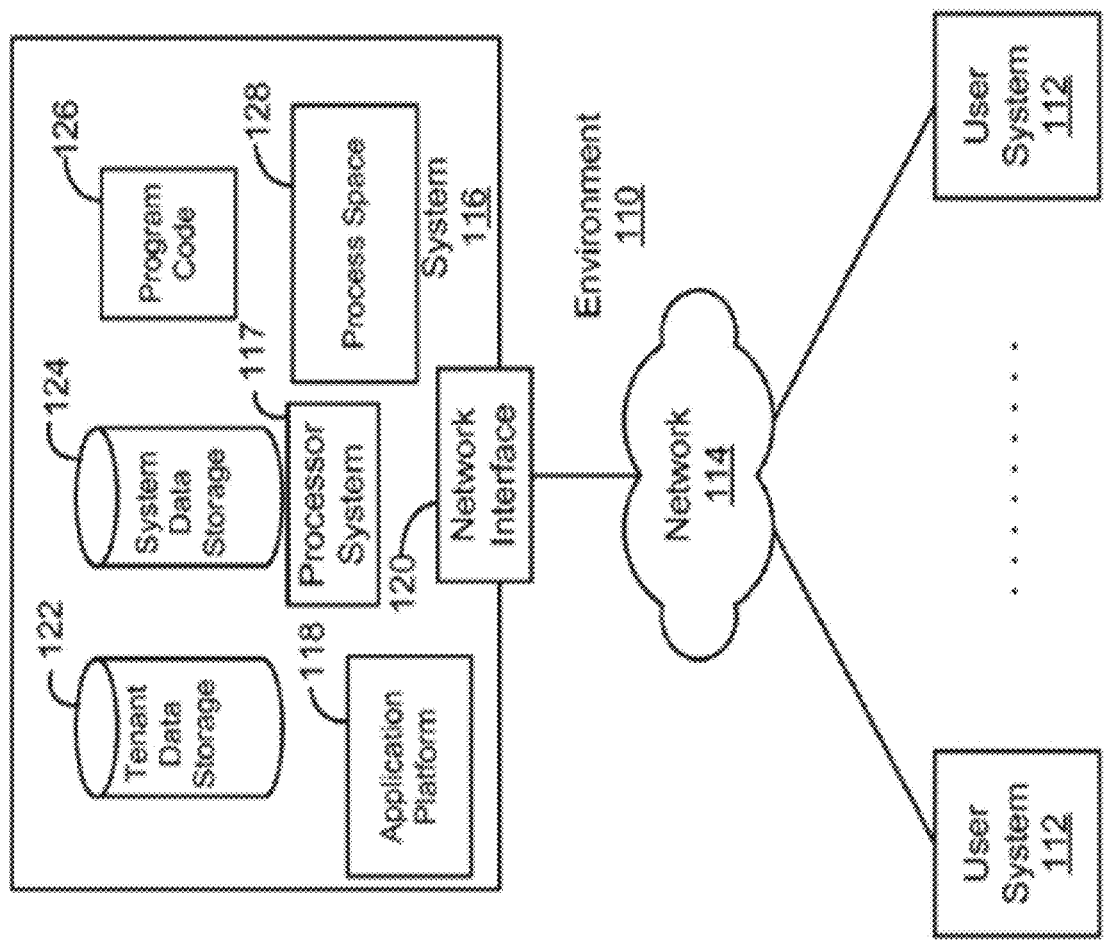
FIG. 1 illustrates a block diagram of an example environment wherein systems and methods for managing and using access credentials for a service provider may be incorporated or employed according to some embodiments.

In the figures, elements having the same designations have the same or similar functions.

DETAILED DESCRIPTION

This description and the accompanying drawings that illustrate aspects, embodiments, implementations, or applications should not be taken as limiting—the claims define the protected invention. Various mechanical, compositional, structural, electrical, and operational changes may be made without departing from the spirit and scope of this description and the claims. In some instances, well-known circuits, structures, or techniques have not been shown or described in detail as these are known to one skilled in the art. Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Overview

As various companies and organizations have moved away from maintaining their own dedicated computer networks to a cloud-based model where some other provider supplies the necessary computer infrastructure, users at such companies/organizations may desire to gain access to information or services from multiple service providers in an integrated manner. For example, an organization might prefer to obtain customer relationship management (CRM) resources from one service provider (e.g., salesforce.com) but obtain competitive intelligence information from another vendor or service provider (e.g., Dun & Bradstreet or InsideView). In some circumstances (e.g., where concerns about security exist, such as, risk of or exposure to system breaches), it may not be possible or desirable to host the services and information of various service providers at a single cloud site. Systems and methods are thus provided for managing access credentials for a service provider at one hosted service system for use in obtaining or gaining access to that service provider's services or information through another hosted service system, where the party operating the first hosted service system is different from the party operating the second hosted service system.

Example Environment

The system of the present disclosure can include, incorporate, or operate in conjunction with or in the environment of a multi-tent cloud-based architecture.

Multi-tenant cloud-based architectures have been developed to improve collaboration, integration, and community-based cooperation between customer tenants without sacrificing data security. Generally speaking, multi-tenancy refers to a system where a single hardware and software platform simultaneously supports multiple user groups (also referred to as "organizations" or "tenants") from a common data storage element (also referred to as a "multi-tenant database"). The multi-tenant design provides a number of advantages over conventional server virtualization systems. First, the multi-tenant platform operator can often make improvements to the platform based upon collective information from the entire tenant community. Additionally, because all users in the multi-tenant environment execute applications within a common processing space, it is relatively easy to grant or deny access to specific sets of data for any user within the multi-tenant platform, thereby improving collaboration and integration between applications and the data managed by the various applications. The multi-tenant architecture therefore allows convenient and cost effective sharing of similar application features between multiple sets of users.

FIG. 1 illustrates a block diagram of an example environment 110 wherein systems and methods for managing and using access credentials for a service provider might be employed, and which may be used to implement embodiments described herein. Environment 110 may include user systems 112, network 114, system 116, processor system 117, application platform 118, network interface 120, tenant data storage 122, system data storage 124, program code 126, and process space 128 for executing database system processes and tenant-specific processes, such as running applications as part of an application hosting service. In other embodiments, environment 110 may not have all of the components listed and/or may have other elements instead of, or in addition to, those listed above.

In some embodiments, the environment 110 is an environment in which an on-demand database service exists. A user system 112 may be any machine or system that is used by a user to access a database user system. For example, any of user systems 112 can be a handheld computing device, a mobile phone, a laptop computer, a notepad computer, a work station, and/or a network of computing devices. As illustrated in FIG. 1 (and in more detail in FIG. 2) user systems 112 might interact via a network 114 with an on-demand database service, which is system 116.

An on-demand database service, such as that which can be implemented using the system 116, is a service that is made available to users outside of the enterprise(s) that own, maintain or provide access to the system 116. As described above, such users do not need to necessarily be concerned with building and/or maintaining the system 116. Instead, resources provided by the system 116 may be available for such users' use when the users need services provided by the system 116—e.g., on the demand of the users. Some on-demand database services may store information from one or more tenants stored into tables of a common database image to form a multi-tenant database system (MTS). Accordingly, the "on-demand database service 116" and the "system 116" will be used interchangeably herein. The term "multi-tenant database system" can refer to those systems in which various elements of hardware and software of a database system may be shared by one or more customers or tenants. For example, a given application server may simultaneously process requests for a great number of customers, and a given database table may store rows of data such as feed items for a potentially much greater number of customers. A database image may include one or more database objects. A relational data base management system (RDBMS) or the equivalent may execute storage and retrieval of information against the data base object(s).

The application platform 118 may be a framework that allows the applications of system 116 to run, such as the hardware and/or software infrastructure, e.g., the operating system. In an embodiment, on-demand database service 116 may include an application platform 118 that enables creating, managing, and executing one or more applications developed by the provider of the on-demand database service, users accessing the on-demand database service via user systems 112, or third party application developers accessing the on-demand database service via user systems 112.

The users of user systems 112 may differ in their respective capacities, and the capacity of a particular user system 112 might be entirely determined by permissions (permission levels) for the current user. For example, where a salesperson is using a particular user system 112 to interact with system 116, that user system has the capacities allotted to that salesperson. However, while an administrator is using that user system 112 to interact with system 116, that user system 112 has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

The network 114 is any network or combination of networks of devices that communicate with one another. For example, the network 114 can be any one or any combination of a local area network (LAN), wide area network (WAN), telephone network, wireless network, point-to-point network, star network, token ring network, hub network, or other appropriate configuration. As the most common type of computer network in current use is a transfer control protocol and Internet protocol (TCP/IP) network, such as the global inter network of networks often referred to as the "Internet" with a capital "I" that network will be used in many of the examples herein. However, it should be understood that the networks that the present invention might use are not so limited, although TCP/IP is a frequently implemented protocol.

The user systems 112 might communicate with system 116 using TCP/IP and, at a higher network level, use other common Internet protocols to communicate. Such as hypertext transfer protocol (HTTP), file transfer protocol (FTP), Andrew file system (AFS), wireless application protocol (WAP), etc. In an example where HTTP is used, user system 112 might include an HTTP client commonly referred to as a "browser" for sending and receiving HTTP messages to and from an HTTP server at system 116. Such an HTTP server might be implemented as the sole network interface between system 116 and network 114, but other techniques might be used as well or instead. In some implementations, the interface between system 116 and network 114 includes load sharing functionality, such as round-robin HTTP request distributors to balance loads and distribute incoming HTTP requests evenly over a plurality of servers. At least for the users that are accessing that server, each of the plurality of servers has access to the MTS data; however, other alternative configurations may be used instead.

In some embodiments, the system 116, shown in FIG. 1, implements a web-based customer relationship management (CRM) system. For example, in one embodiment, system 116 includes application servers configured to implement and execute CRM software applications as well as provide related data, code, forms, webpages and other information to and from user systems 112 and to store to, and retrieve from, a database system related data, objects, and web page content. With a multi-tenant system, data for multiple tenants may be stored in the same physical database object. However, tenant data typically is arranged so that data of one tenant is kept logically separate from that of other tenants so that one tenant does not have access to another tenant's data, unless such data is expressly shared. In certain embodiments, the system 116 implements applications other than, or in addition to, a CRM application. For example, system 16 may provide tenant access to multiple hosted (standard and custom) applications, including a CRM application. User (or third party developer) applications, which may or may not include CRM, may be supported by the application platform 118, which manages creation, storage of the applications into one or more database objects, and executing of the applications in a virtual machine in the process space of the system 116.

One arrangement for elements of the system 116 is shown in FIG. 1, including the network interface 120, the application platform 118, the tenant data storage 122 for tenant data 123, the system data storage 124 for system data 125 accessible to system 116 and possibly multiple tenants, the program code 126 for implementing various functions of the system 116, and the process space 128 for executing MTS system processes and tenant-specific processes, such as running applications as part of an application hosting service. Additional processes that may execute on system 116 include database indexing processes.

Several elements in the system shown in FIG. 1 include conventional, well-known elements that are explained only briefly here. For example, each of the user systems 112 could include a desktop personal computer, workstation, laptop, notepad computer, PDA, cell phone, or any wireless access protocol (WAP) enabled device or any other computing device capable of interfacing directly or indirectly to the Internet or other network connection. Each of the user systems 112 typically runs an HTTP client, e.g., a browsing program, such as Microsoft's Internet Explorer browser, Netscape's Navigator browser, Opera's browser, or a WAP-enabled browser in the case of a cell phone, notepad computer, PDA or other wireless device, or the like, allowing a user (e.g., subscriber of the multi-tenant database system) of the user systems 112 to access, process, and view information, pages, and applications available to it from the system 116 over the network 114. Each of the user systems 112 also typically includes one or more user interface devices, such as a keyboard, a mouse, trackball, touch pad, touch screen, pen or the like, for interacting with a graphical user interface (GUI) provided by the browser on a display (e.g., a monitor screen, liquid crystal display (LCD) monitor, light emitting diode (LED) monitor, organic light emitting diode (OLED) monitor, etc.) in conjunction with pages, forms, applications, and other information provided by the system 116 or other systems or servers. For example, the user interface device can be used to access data and applications hosted by system 116, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each of the user systems 112 and all of its components are operator configurable using applications, such as a browser, including computer code run using a central processing unit such as an Intel Pentium® processor or the like. Similarly, system 116 (and additional instances of an MTS, where more than one is present) and all of their components might be operator configurable using application(s) including computer code to run using a central processing unit such as the processor system 117, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring the system 116 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a read only memory (ROM) or random-access memory (RAM), or provided on any media capable of storing program code, such as any type of rotating media including floppy disks, optical discs, digital versatile disk (DVD), compact disk (CD), microdrive, and magneto-optical disks, and magnetic or optical cards, nano-systems (including molecular memory integrated circuits (ICs)), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, virtual private network (VPN), LAN, etc.) using any communication medium and protocols (e.g., TCP/IP, HTTP, HTTPS, Ethernet, etc.) as are well known. It will also be appreciated that computer code for implementing embodiments of the present invention can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun MicroSystems, Inc.).

According to one embodiment, the system 116 is configured to provide webpages, forms, applications, data and media content to the user (client) systems 112 to support the access by the user systems 112 as tenants of the system 116. As such, the system 116 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., object oriented data base management system (OODBMS) or rational database management system (RDBMS)) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 2:
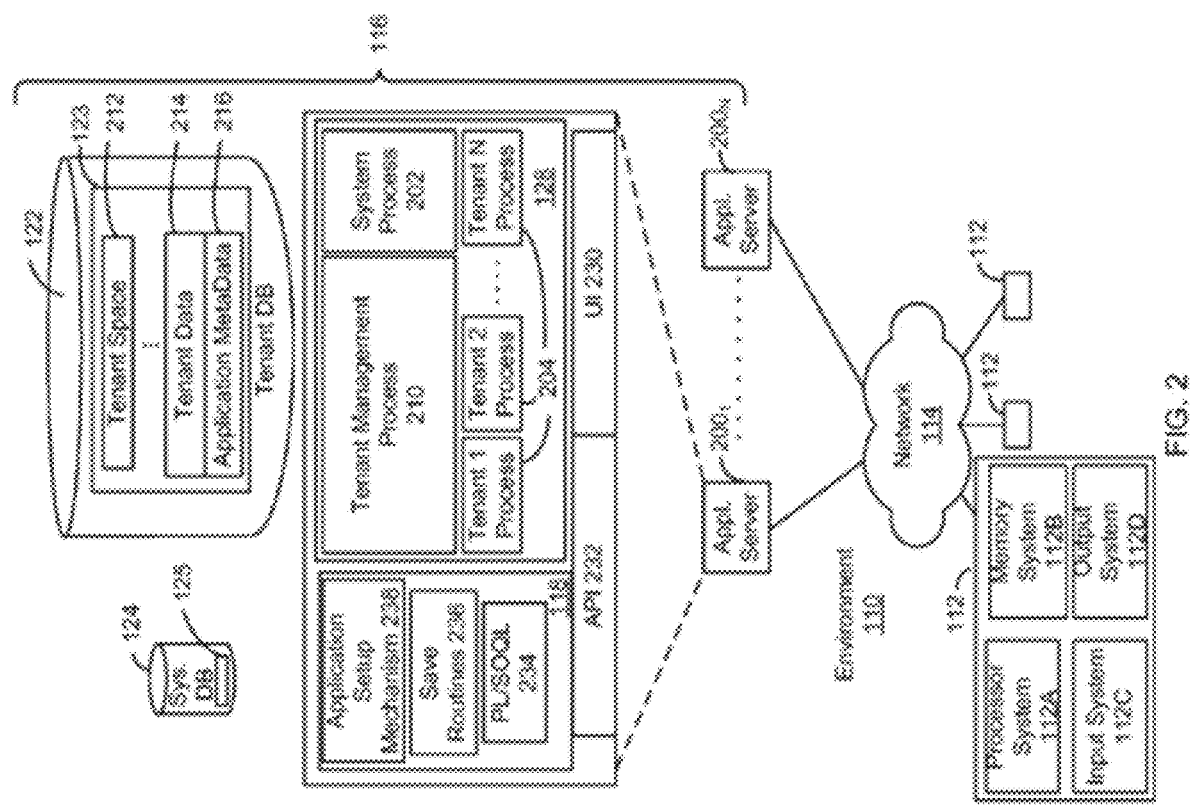
FIG. 2 illustrates a block diagram of another example environment according to some embodiments.

FIG. 2 also illustrates the environment 110, which may be used to implement embodiments described herein. FIG. 2 further illustrates elements of system 116 and various interconnections, according to some embodiments. FIG. 2 shows that each of the user systems 112 may include a processor system 112A, a memory system 112B, an input system 112C, and an output system 112D. FIG. 2 shows the network 114 and the system 116. FIG. 2 also shows that the system 116 may include the tenant data storage 122, the tenant data 123, the system data storage 124, the system data 125, a user interface (UI) 230, an application program interface (API) 232, a PL/Salesforce.com object query language (PL/SOQL) 234, save routines 236, an application setup mechanism 238, applications servers $200_1$-$200_N$, a system process space 202, tenant process spaces 204, a tenant management process space 210, a tenant storage area 212, a user storage 214, and application metadata 216. In other embodiments, environment 110 may not have the same elements as those listed above and/or may have other elements instead of, or in addition to, those listed above.

The user systems 112, the network 114, the system 116, the tenant data storage 122, and the system data storage 124 were discussed above in FIG. 1. Regarding the user systems 112, the processor system 112A may be any combination of one or more processors. The memory system 112B may be any combination of one or more memory devices, short term, and/or long term memory. The input system 112C may be any combination of input devices, such as one or more keyboards, mice, trackballs, scanners, cameras, and/or interfaces to networks. The output system 112D may be any combination of output devices, such as one or more monitors, printers, and/or interfaces to networks. As shown in FIG. 2, the system 116 may include the network interface 120 (of FIG. 1) implemented as a set of HTTP application servers 200, the application platform 118, the tenant data storage 122, and the system data storage 124. Also shown is system process space 202, including individual tenant process spaces 204 and the tenant management process space 210. Each application server 200 may be configured to access tenant data storage 122 and the tenant data 123 therein, and the system data storage 124 and the system data 125 therein to serve requests of the user systems 112. The tenant data 123 might be divided into individual tenant storage areas 212, which can be either a physical arrangement and/or a logical arrangement of data. Within each tenant storage area 212, the user storage 214 and the application metadata 216 might be similarly allocated for each user. For example, a copy of a user's most recently used (MRU) items might be stored to the user storage 214. Similarly, a copy of MRU items for an entire organization that is a tenant might be stored to the tenant storage area 212. The UI 230 provides a user interface and the API 232 provides an application programmer interface to the system 116 resident processes and to users and/or developers at the user systems 112. The tenant data and the system data may be stored in various databases, such as one or more Oracle™ databases.

The application platform 118 includes an application setup mechanism 238 that supports application developers' creation and management of applications, which may be saved as metadata into tenant data storage 122 by the save routines 236 for execution by subscribers as one or more tenant process spaces 204 managed by the tenant management process 210, for example. Invocations to such applications may be coded using PL/SOQL 234 that provides a programming language style interface extension to the API 232. Some embodiments of PL/SOQL language are discussed in further detail in U.S. Pat. No. 7,730,478, filed Sep. 21, 2007, entitled, "Method and System For Allowing Access to Developed Applications Via a Multi-Tenant On-Demand Database Service," which is incorporated herein by reference. Invocations to applications may be detected by one or more system processes, which manage retrieving the application metadata 216 for the subscriber, making the invocation and executing the metadata as an application in a virtual machine.

Each application server 200 may be communicably coupled to database systems, e.g., having access to the system data 125 and the tenant data 123, via a different network connection. For example, one application server $200_1$ might be coupled via the network 114 (e.g., the Internet), another application server $200_{N-1}$ might be coupled via a direct network link, and another application server $200_N$ might be coupled by yet a different network connection. Transfer Control Protocol and Internet Protocol (TCP/IP) are typical protocols for communicating between application servers 200 and the database system. However, it will be apparent to one skilled in the art that other transport protocols may be used to optimize the system depending on the network connection used.

In certain embodiments, each application server 200 is configured to handle requests for any user associated with any organization that is a tenant. Because it is desirable to be able to add and remove application servers from the server pool at any time for any reason, there is preferably no server affinity for a user and/or organization to a specific application server 200. In one embodiment, therefore, an interface system implementing a load balancing function (e.g., an F5 Big-IP load balancer) is communicably coupled between the application servers 200 and the user systems 112 to distribute requests to the application servers 200. In one embodiment, the load balancer uses a least connections algorithm to route user requests to the application servers 200. Other examples of load balancing algorithms, such as round robin and observed response time, also can be used. For example, in certain embodiments, three consecutive requests from the same user could hit three different application servers 200, and three requests from different users could hit the same application server 200. In this manner, the system 116 is multi-tenant, wherein the system 116 handles storage of, and access to, different objects, data and applications across disparate users and organizations.

As an example of storage, one tenant might be a company that employs a sales force where each salesperson uses the system 116 to manage his or her sales process. Thus, a user might maintain contact data, leads data, customer follow-up data, performance data, goals and progress data, etc., all applicable to that user's personal sales process (e.g., in the tenant data storage 122). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by the system 116 that are allocated at the tenant level while other data structures might be managed at the user level. Because a MTS might support multiple tenants including possible competitors, the MTS should have security protocols that keep data, applications, and application use separate. Also, because many tenants may opt for access to a MTS rather than maintain their own system, redundancy, up-time, and backup are additional functions that may be implemented in the MTS. In addition to user-specific data and tenant specific data, the system 116 might also maintain system level data usable by multiple tenants or other data. Such system level data might include industry reports, news, postings, and the like that are sharable among tenants.

In certain embodiments, the user systems 112 (which may be client systems) communicate with the application servers 200 to request and update system-level and tenant-level data from the system 116 that may require sending one or more queries to the tenant data storage 122 and/or the system data storage 124. The system 116 (e.g., an application server 200 in the system 116) automatically generates one or more structured query language (SQL) statements (e.g., one or more SQL queries) that are designed to access the desired information. The system data storage 124 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table."

In some multi-tenant database systems, tenants may be allowed to create and store custom objects, or they may be allowed to customize standard entities or objects, for example by creating custom fields for standard objects, including custom index fields. Systems and methods for creating custom objects as well as customizing standard objects in a multi-tenant database system are described in further detail in U.S. Pat. No. 7,779,039, filed Apr. 2, 2004, entitled "Custom Entities and Fields in a Multi-Tenant Database System," which is incorporated herein by reference. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

In the environment of a multi-tenant database system, such as system 116, one or more of the organizations may wish to access services or information that are provided by various vendors or service providers that are separate and distinct from the party operating the database system. The information or services provided by such service provider can supplement or complement the services provided by the database system. For example, whereas in some embodiments system 116 may provide customer relationship management (CRM) services to the organizations, other vendors or service providers (e.g., Dun & Bradstreet or InsideView) can offer competitive intelligence information.

For an enhanced or better user experience, the organizations accessing system 116 might prefer to obtain or utilize the supplementary or complementary resources and information (provided by the other vendors or service providers) via, and/or in conjunction with, system 116. To accomplish this, the various organizations might be issued or assigned respective credentials (e.g., user name, password, security keys, access keys, etc.) that allow them to access these other services or information. In some circumstances, however, it is preferable that the party operating the database system 116 not maintain the access credentials. For example, the database system 116 could be subject to hacking or security attacks, or information/data of system 116 might be exposed if it moves through public channels, thus subjecting the party operating the database system 116 to liability and overhead. As such, according to some embodiments, systems and methods are provided for managing such access credentials using a hosted service system operated by a party that is different from the one operating the database system.

Managing Access Credentials

According to some embodiments, in the environment of a multi-tenant database system accessible by a plurality of organizations, such as system 116 shown and described with respect to FIGS. 1 and 2, systems and methods are provided for managing access credentials for a service provider at a hosted service system for use in obtaining or gaining access to that service provider's services or information through the database system, where the party operating the hosted service system is different from the party operating the database system.

Figure 3:
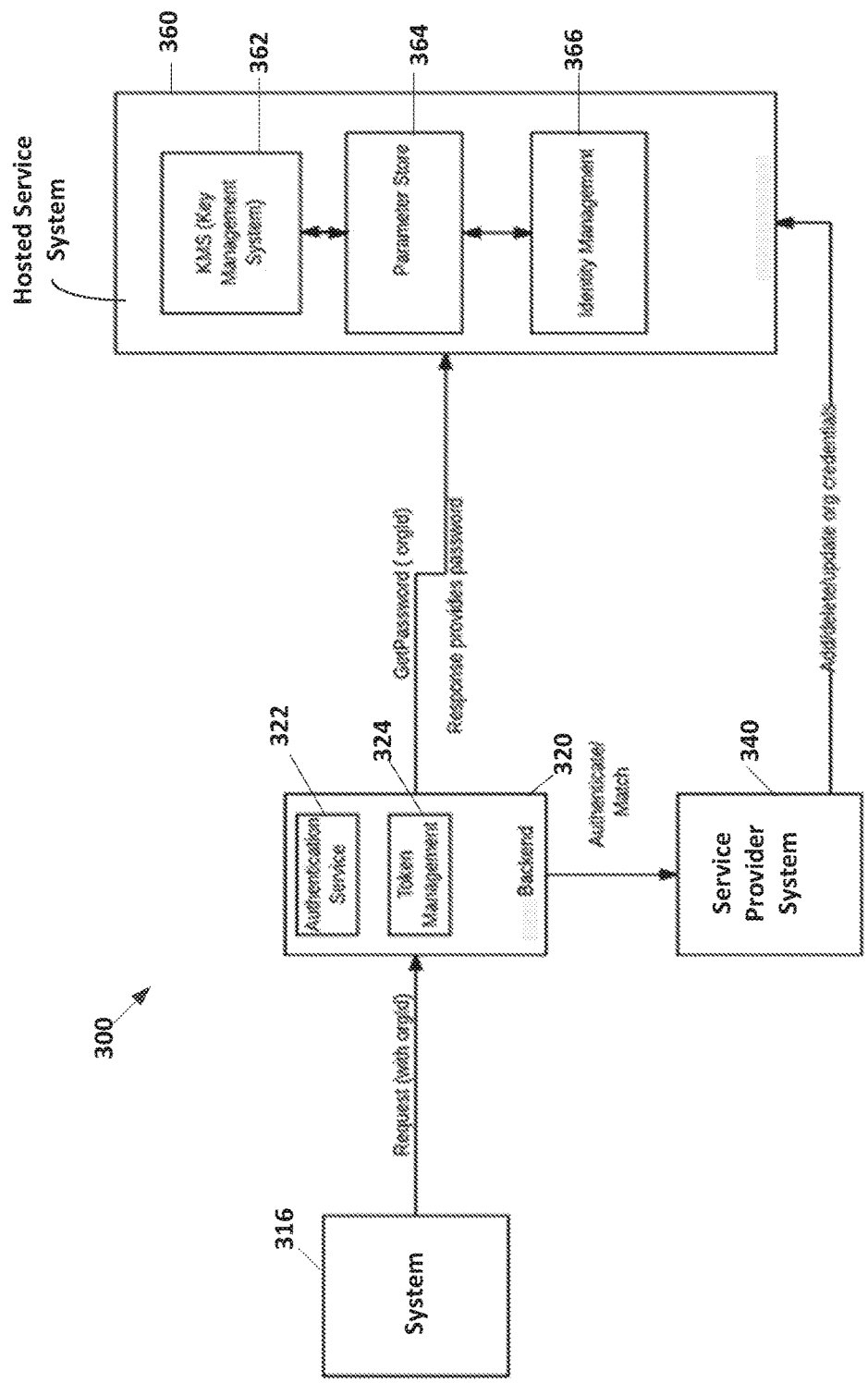
FIG. 3 illustrates a block diagram of a system for managing and using access credentials for a service provider according to some embodiments.

FIG. 3 illustrates a block diagram of a system 300 for managing and using access credentials for a service provider according to some embodiments. As shown in FIG. 3, system 300 includes a database system 316, a back end system 320, a service provider system 340, and a hosted service system 360.

The database system 316 provides or supports database services. In some embodiments, database system 316 can include, incorporate, or be implemented as a multi-tenant system 116, as shown and described with reference to FIGS. 1 and 2, which provides or supports a web-based CRM service system for, and is accessible by, a number of organizations. Users from such organizations may interact with the database system 316 using respective user systems 112 (as described with reference to FIGS. 1 and 2) connected to or communicating with a front end system of the database.

One or more service providers, separate from the provider operating and maintaining the database system 316, may offer to the organizations using database system 316 other services or information in addition to those provided by system 316. Such service providers can be, for example, Dun & Bradstreet or InsideView, which offer competitive intelligence information and services. The additional services or information may be supported, hosted, or maintained at a service provider system 340, which is implemented with suitable hardware/software (e.g., work station, server, and/or a network of computing devices, and API) for this purpose. The service provider system 340 can be separate from the database system 316.

For a better or enhanced user experience, however, it may be desirable that these additional services or information be made available to the various organizations through the database system 316. To accomplish this, the back end system 320 integrates a service provider system 340 with the database system 316. Database system 316 and back end system 320 have a trusted relationship. Back end system 320 can be part of, or separate from, database system 316. The back end system 320 provides access to the database system 316 for the transfer of information, data, and support that is not necessarily visible to the users interacting on the front end. The back end system 320 includes suitable hardware/ software, such as one or more servers, computers, and applications. In some embodiments, the backend system 320 may be incorporated into the multi-tenant system 116. In some embodiments, backend system 320 may be implemented in part with a Lighting Data Service, available from salesforce.com, that provides or is implemented with one or more APIs.

To on-board the other service providers so that their services or information are made available to the various organizations through the database system 316, the back end system 320 includes an authentication service module 322 and a token management module 324. Every organization wanting to access or obtain the additional services or information offered by another service provider will separately authenticate with that service provider. Authentication service module 322 supports this authentication, for example, by interacting with an API at service provider system 340, so that the service provider can better manage the organizations with which it may have a relationship (e.g., as customers). Authentication service module 322 uses token management to authenticate with third party service providers, checks access credentials (such as security or encryption keys) that are assigned or issued to organizations for access to the additional services or information offered by the outside service provider. After authentication service module 322 has authenticated a user or organization for a service provider, the token management module 324 generates tokens which are used to manage access or interaction between database system 316 and service provider system 340 for the authenticated user/organization. The service provider system 340, through its API, fetches or obtains the tokens generated by token management module 324. In some embodiments, these tokens are temporary, only being effective for a predetermined amount of time (e.g., 24 hours). Authentication service module 322 and token management module 324 thus enable service provides to control or manage the services or information allowed for an organization, concurrency limits (i.e., how many users of an organization may be allowed access to the services at any given time), etc. Also, this arrangement between backend system 320 and service provider system 340 will be compliant with industry standard security protocols for authentication, as the backend system 320 will be authenticating with service provider system 340 directly with no proxy in between that connection.

The hosted web service system 360 is operated or maintained by a provider that is different from the provider operating and maintaining the database system 316. In some embodiments, hosted web service system 360 can be implemented or utilize, for example, one or more servers, computers, services, etc. of Amazon Web Services. Hosted web services system 360 communicates or exchanges information and data with database system 316 through backend system 320 and with service provider system 340.

In some embodiments, as shown, hosted web service system 360 includes a key management service module 362, a systems manager parameter store module 364, and an identity and access management module 366. Key management service module 362 is used to store access credentials, such as security or encryption keys, that are used by various organizations to access the additional services or information of outside providers via the database system 316. In some embodiments, key management service module 362 uses hardware security modules for securing the keys. The systems manager parameter store module 364 provides secure, hierarchical storage for configuration data management and secrets management. The systems manager parameter store module 364 may be used to store credentials as "Secure String," an option that may be selected, for example, by an outside service provider. The systems manager parameter store module 364 may be integrated with the key management service module 362 and automatically encrypts all the secrets that are stored. The identity and access management module 366 controls access to these secrets. Neither the backend system 320 nor the database system 316 will store the organization access credentials at all, but instead will store temporary (not persistent) tokens For use of the hosted web service system 360, either the provider of database system 316 or the outside service provider (offering the additional services and information) should have an account with the hosted web service system 360.

Figure 4:
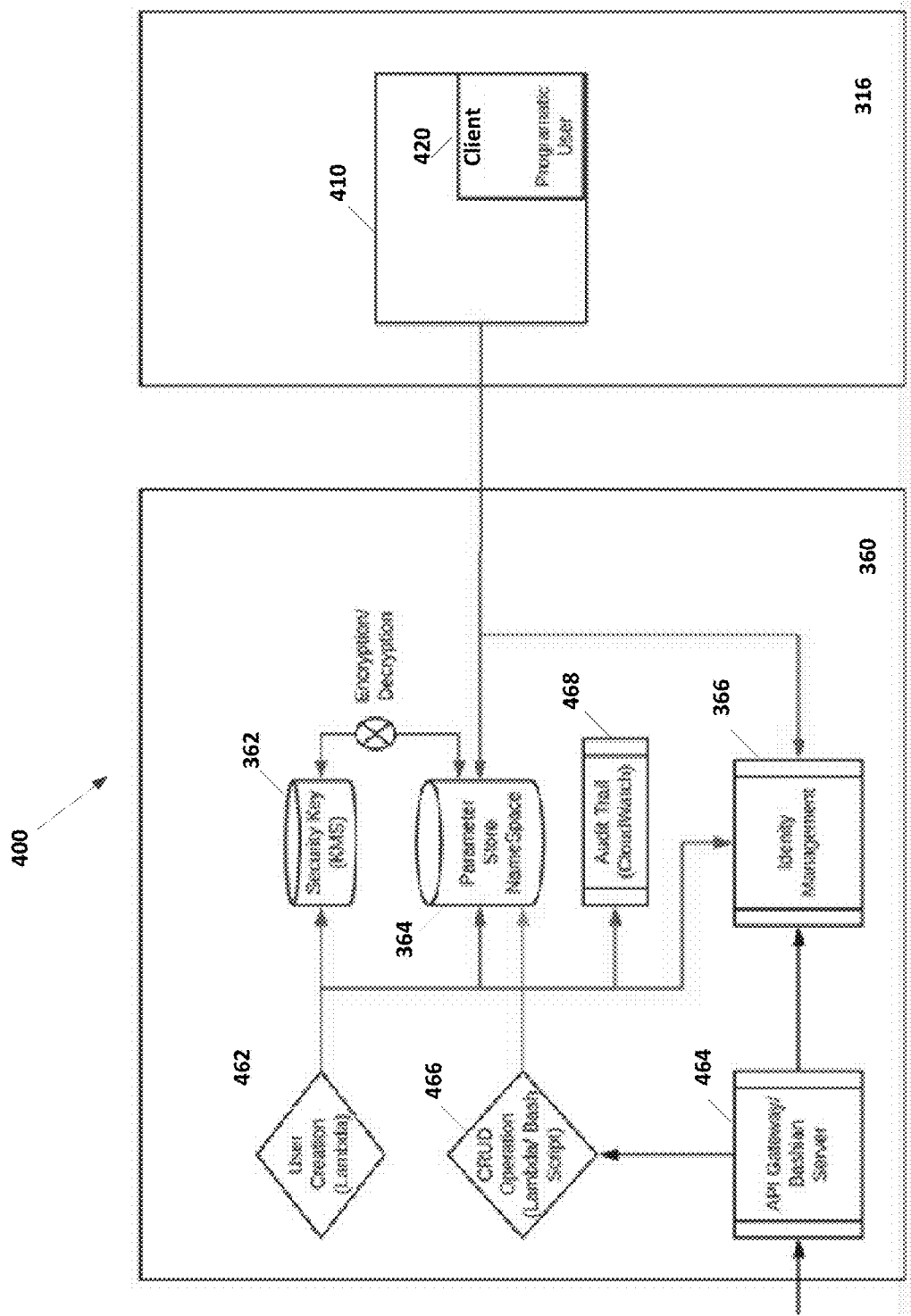
FIG. 4 illustrates a block diagram of a system for establishing an account with a hosted web service system for managing and using access credentials according to some embodiments.

FIG. 4 illustrates a block diagram of a system 400 for establishing an account with a hosted web service system for managing and using access credentials according to some embodiments. System 400 includes database system 316 and hosted web service system 360.

Database system 316 includes an interface system 410 for interfacing or communicating with hosted web service system 360. In some embodiments, the interface system 410 may include or incorporate backend system 320. As shown, the interface system 410 can be implemented, for example, as a client device 420 that interacts with one or more computing devices acting as servers at the hosted web service system 360. Client device 420 facilitates coordination between outside service providers wishing to provide additional services or information to organizations accessing database system 316, such providers' systems 340, and web service system 360. Client device 420 runs various programs or modules that interact with hosted web service system 360 set up, create, and/or manage accounts, credentials, etc., for the various outside service providers and their systems 340. For example, each outside service provider will be assigned or provided with respective login credentials (programmatic, user interface (UI), or both) to the hosted web service system 360 that the provider, or its respective service provider system 340, can use to enter and manage access credentials for the organizations that it serves through database system 316.

Hosted web service system 360 includes one or more programs or modules that interact with client device 420 of database system 316, or with a service provider system 340, to set up, create, and/or manage accounts, credentials, etc. for the various outside service providers. Each outside service provider manages the access credentials for the organizations with whom the provider has a relationship (e.g., as a customer). Using the login credentials provided by database system 316, the service provider or its system 340 logs in to the hosted web service system 360 at an API gateway system 464. Once logged in, the service provider or system 340 can initiate or enter a serverless function/specific instance 466, through which the provider or system 340 can manage credentials, for example, by viewing or identifying all organizations that are enabled for its services; adding, updating, or removing their API credentials in the hosted web service system 360; enabling or disabling viewing of decrypted passwords.

A user creation module 462 provides, assists, or supports the creation of the access credentials, such as security keys, which can be stored or maintained in systems manager parameter store (SMPS) module 364. In some embodiments, the access credentials can be auto-backed by serverless functions in a separate availability zone/data center in the same geographic region. This will ensure that credentials in the region will never leave that region, but if required, but can still be configured for disaster recovery.

The access credentials or security keys are used to grant organizations access to the additional services and information provided by the outside service provider; they will be used by the backend system 320 to authenticate organizations with the service provider.

An audit trail module 468 may monitor and track the activity related to, or conducted using, the access credentials, for example, to ensure compliant with various rules, regulations, and standards, such as SOC1, SOC2, SOC3, Fed RAMP, HIPAA, etc.

Each outside service provider will have its own key management service key, which can be auto-generated by key management service module 362. Alternatively, the outside service provider or its system 340 uploads credentials, which can be encrypted by a specific key management service key. The key management service module 362 may store or maintain the access credentials or key management service keys for the service providers.

Figure 5:
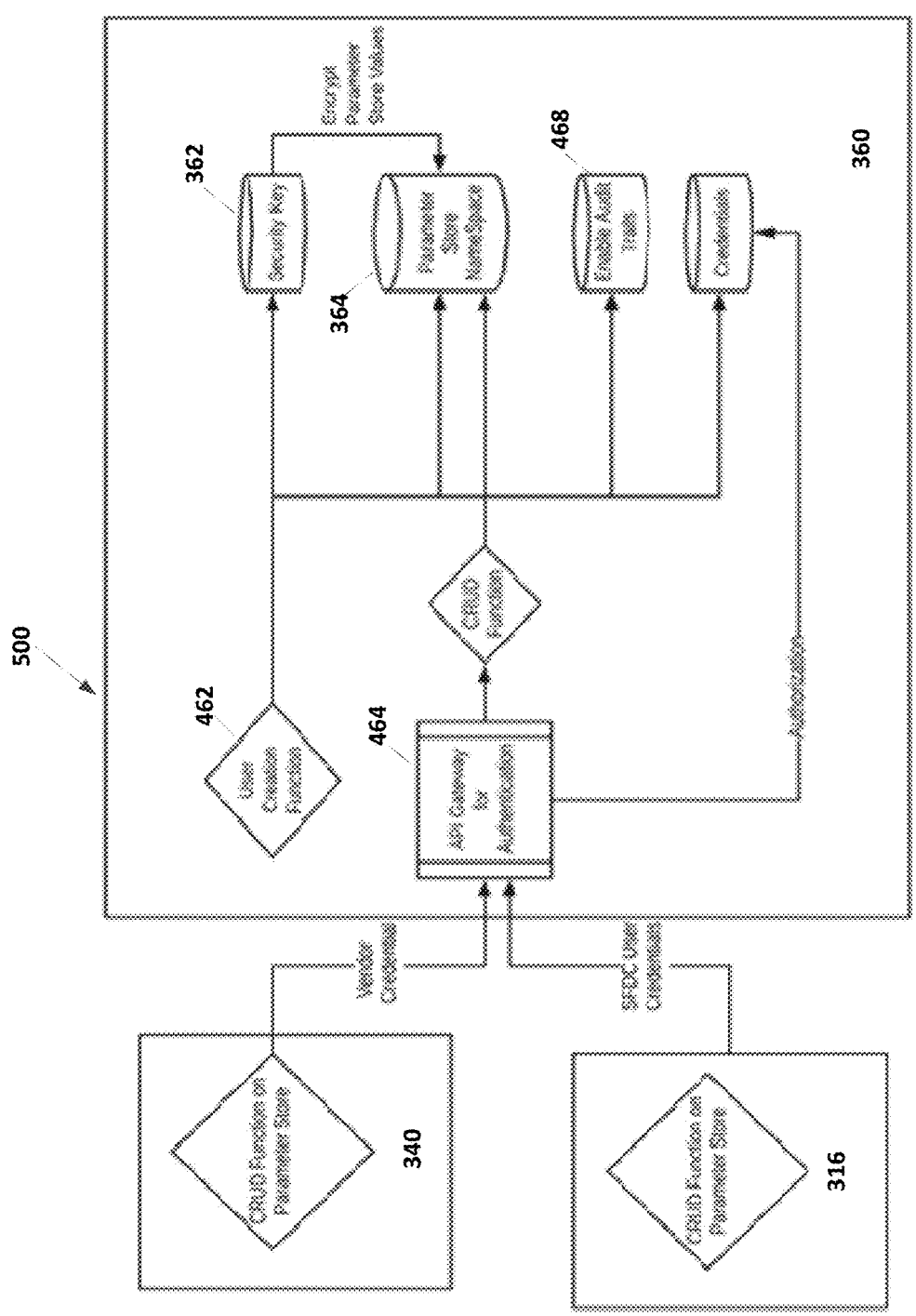
FIG. 5 illustrates a block diagram of another system for establishing an account with a hosted web service system for managing and using access credentials according to some embodiments.

FIG. 5 illustrates a block diagram of another system 500 for establishing an account with a hosted web service system for managing and using access credentials according to some embodiments. With the system 500 of FIG. 5, each outside service provider creates its own account with the hosted web service system 360.

Operational Flow

Figure 6:
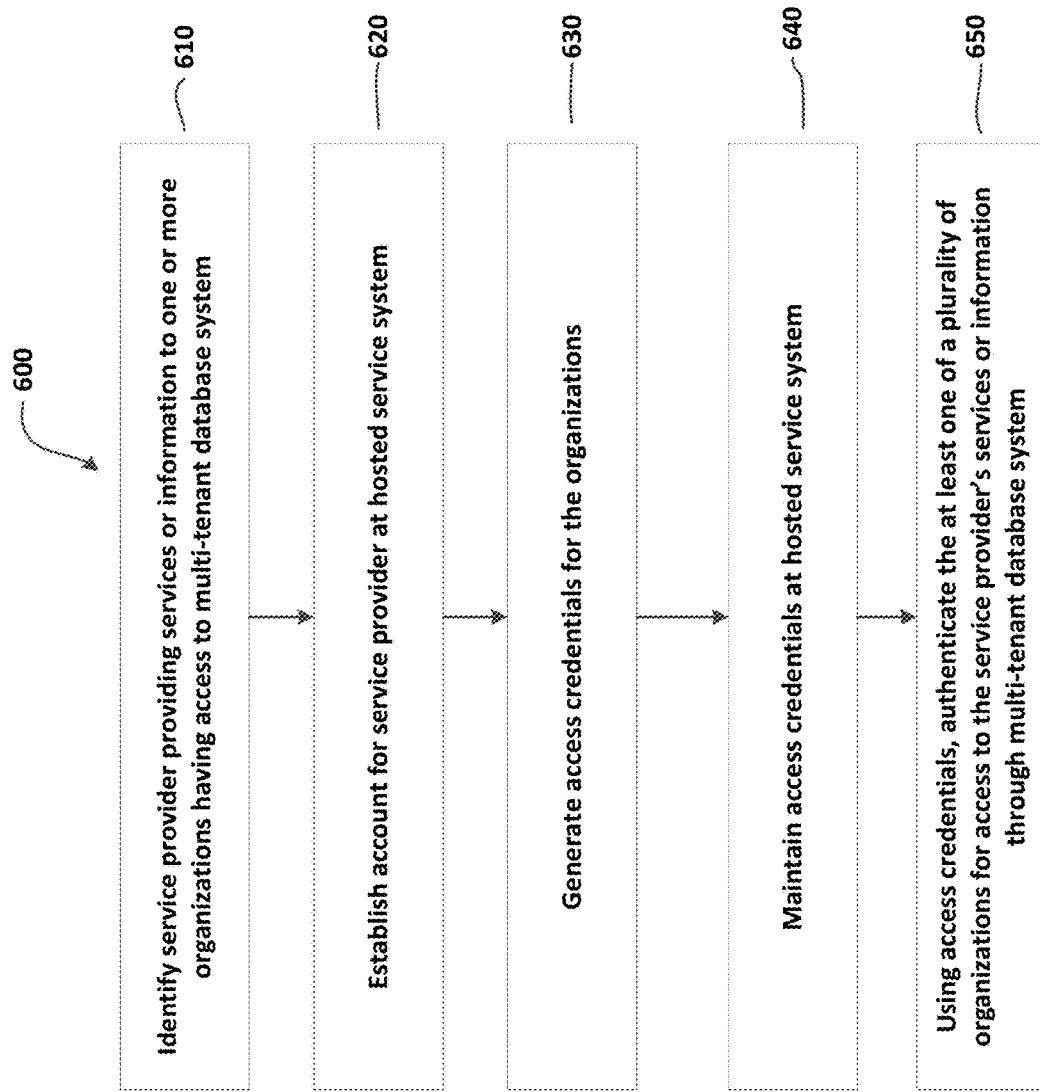
FIG. 6 is a simplified diagram of a method for managing and using access credentials for a service provider according to some embodiments.

FIG. 6 is a simplified diagram of a method 600 for managing and using access credentials for a service provider according to some embodiments. One or more of the processes 610-650 of method 600 may be implemented, at least in part, in the form of executable code stored on non-transitory, tangible, machine-readable media that when run by one or more processors may cause the one or more processors to perform one or more of the processes 610-650. In some embodiments, method 600 can be performed by one or more computing devices in systems 300, 400, or 500 of FIGS. 3, 4, and 5, including the database system 316, the backend 320, the service provider system 340, or the hosted web service system 360. Aspects of the processes 610-650 of method 600 have been covered in the description for FIGS. 3-5; additional aspects are provided below.

Referring to FIGS. 3, 4, and 6, at a process 610, a multi-tenant database system 316 identifies a service provider that is providing, or desires to provide, services or information to at least one of a plurality of organizations having access to the database system. The services or information can supplement or complement the database services provided to the organizations by database system 316 itself. For example, the additional services can competitive intelligence services offered by service providers such as Dun & Bradstreet or InsideView. For a better or enhanced user experience, it may be desirable that these additional services or information be made available to the various organizations through the database system 316. In some embodiments, database system 316 may identify the outside service provider by surveying the various organizations that the system 316 serves, or by surveying the service providers themselves.

At a process 620, the database system 316 establishes an account for service provider at a hosted service system 360. To accomplish this, in some embodiments, a client 420 of database system 316 interacts with the hosted service system 360, providing information such as the identity of the service provider, contact information, etc. The hosted service system 360 is operated or maintained by a party that is different from party operating or maintaining the database system 316. So that the service provider can access the account at the hosted service system 360, the database system 316 creates login credentials for the account and transmits the same to the service provider system 340.

At a process 630, after the account has been established for the outside service provider, access credentials are generated for each organization to which the service provider is providing, or desires to provide, additional services or information. In some embodiments, the service provider or its system 340 provides the identity of each organization (orgId) and information about the particular services allowed or enabled, concurrency limits, etc. In response, for each organization identified by the service provider system 340, the user creation module 462 of hosted service system 360 creates separate access credentials, for example, security or encryption keys. The access credentials are encrypted and stored in systems manager parameter store module 364.

At a process 640, the access credentials for the various organizations are maintained at hosted service system 360. Maintaining the access credentials may include adding, deleting, and updating the credentials (e.g., security keys) to reflect changes in the relationships of the service provider and the various organizations.

At a process 650, when an organization wishes to access the outside service provider's services or information through the database system 316, the system 316 authenticates that organization via backend system 320 using the respective access credentials. The database system 316 sends an access request, which includes the identity of the organization (orgId), to the backend system 320 while making a match call. For the first call, backend system 320 obtains or retrieves credentials for that organization from the systems manager parameter store module 364, and authenticates the credentials against the service provider. Upon successful authentication, the organization gains access to the desired services or information from the service provider through database system 316. The service provider or system 340 provides a session token which will work for subsequent calls, which in some embodiments, may remain valid for a predetermined amount of time (e.g., 24 hours). The token management module 324 of backend system 320 caches this session token for the organization for subsequent calls made during the predetermined time that the token is valid. As such, the access credentials need not be obtained or used for every call by an organization to obtain or access the desired additional services or information from the service provider. When the token needs to be refreshed, backend system 320 will again follow the same procedure of obtaining or retrieving credentials from the hosted service system 360, authenticating them with the service provider, and caching the new token for that organization. The service provider system 340 can manage the credentials for the organizations that the respective service provider serves, so that the database system 316 is not required to do so.

In some embodiments, the account for hosted service system 360 can be managed or owned by the service provider system 340, and provide access to backend system 320 while fetching the credentials. In this way, backend system 320 does not need to change any algorithm to connect to any hosted service system 360 with the account managed or owned by service provider system 340.

Although illustrative embodiments have been shown and described, a wide range of modifications, changes and substitutions are contemplated in the foregoing disclosure and in some instances, some features of the embodiments may be employed without a corresponding use of other features. One of ordinary skill in the art would recognize many variations, alternatives, and modifications. Thus, the scope of the present application should be limited only by the following claims, and it is appropriate that the claims be construed broadly and in a manner consistent with the scope of the embodiments disclosed herein.

What is claimed is:

1. A computing device comprising:
 a memory containing machine readable medium storing machine executable code;
 one or more processors coupled to the memory and configured to execute the machine executable code to cause the one or more processors to:
  identify, by a multi-tenant database system provided by a first party, a service provider providing services or information to at least one of a plurality of organizations having access to the multi-tenant database system;
  establish, by the multi-tenant database system, an account for the service provider at a hosted service system, the hosted service system provided by a third party that is different from the first party providing the multi-tenant database system, the account for maintaining access credentials for the at least one of the plurality of organizations to the service provider's services or information, wherein the access credentials are not maintained at the multi-tenant database system;
  send, by the multi-tenant database system and to the hosted service system, an access request including an identity of the at least one of the plurality of organizations for access to the service provider; and
  using the credentials from the hosted service system, authenticate, by the multi-tenant database system, the at least one of a plurality of organizations for access to the service provider's services or information through the multi-tenant database system.

2. The computing device of claim 1, wherein the one or more processors are further configured to create login credentials for the account and transmit the login credentials to the service provider so that the service provider may access the account.

3. The computing device of claim 1, wherein the access credentials are created by a service provider system working in conjunction with the hosted service system.

4. The computing device of claim 1, wherein the access credentials comprise a security key for the at least one organization to use to access the service provider's services or information through the multi-tenant database system.

5. The computing device of claim 1, wherein after authenticating the at least one of a plurality of organizations, the one or more processors are further configured to receive a token from a service provider system to enable the at least one of a plurality of organizations to access the service provider's services or information through the multi-tenant database system.

6. The computing device of claim 1, wherein the access credentials are maintained in an encrypted form at the hosted service system.

7. The computing device of claim 1, wherein after establishing an account for the service provider at a hosted service system, a service provider system creates access credentials for each organization having access to a multi-tenant database system for which the service provider provides services or information.

8. A non-transitory machine readable medium having stored thereon instructions for performing a method comprising machine executable code which when executed by at least one machine, causes the machine to:
 identify, by a multi-tenant database system provided by a first party, a service provider providing services or information to at least one of a plurality of organizations having access to the multi-tenant database system;
 establish, by the multi-tenant database system, an account for the service provider at a hosted service system, the hosted service system provided by a third party that is different from the first party providing the multi-tenant database system, the account for maintaining access credentials for the at least one of the plurality of organizations to the service provider's services or information, wherein the access credentials are not maintained at the multi-tenant database system;
 send, by the multi-tenant database system and to the hosted service system, an access request including an identity of the at least one of the plurality of organizations for access to the service provider; and
 using the credentials from the hosted service system, authenticate, by the multi-tenant database system, the at least one of a plurality of organizations for access to the service provider's services or information through the multi-tenant database system.

9. The non-transitory machine readable medium of claim 8, wherein the machine is further caused to create login credentials for the account and transmit the login credentials to the service provider so that the service provider may access the account.

10. The non-transitory machine readable medium of claim 8, wherein the access credentials are created by a service provider system working in conjunction with the hosted service system.

11. The non-transitory machine readable medium of claim 8, wherein the access credentials comprise a security key for the at least one organization to use to access the service provider's services or information through the multi-tenant database system.

12. The non-transitory machine readable medium of claim 8, wherein after authenticating the at least one of a plurality of organizations, the machine is further caused to receive a token from a service provider system to enable the at least one of a plurality of organizations to access the service provider's services or information through the multi-tenant database system.

13. The non-transitory machine readable medium of claim 8, wherein the access credentials are maintained in an encrypted form at the hosted service system.

14. The non-transitory machine readable medium of claim 8, wherein after establishing an account for the service provider at a hosted service system, a service provider system creates access credentials for each organization having access to a multi-tenant database system for which the service provider provides services or information.

15. A method performed by one or more processor executing machine executable code, the method comprising:
   identify, by a multi-tenant database system provided by a first party, a service provider providing services or information to at least one of a plurality of organizations having access to the multi-tenant database system;
   establish, by the multi-tenant database system, an account for the service provider at a hosted service system, the hosted service system provided by a third party that is different from the first party providing the multi-tenant database system, the account for maintaining access credentials for the at least one of the plurality of organizations to the service provider's services or information, wherein the access credentials are not maintained at the multi-tenant database system;
   send, by the multi-tenant database system and to the hosted service system, an access request including an identity of the at least one of the plurality of organizations for access to the service provider; and
   using the credentials from the hosted service system, authenticate, by the multi-tenant database system, the at least one of a plurality of organizations for access to the service provider's services or information through the multi-tenant database system.

16. The method of claim 15, further comprising:
   creating login credentials for the account; and
   transmitting the login credentials to the service provider so that the service provider may access the account.

17. The method of claim 15, wherein the access credentials are created by a service provider system working in conjunction with the hosted service system.

18. The method of claim 15, wherein the access credentials comprise a security key for the at least one organization to use to access the service provider's services or information through the multi-tenant database system.

19. The method of claim 15, after authenticating, further comprising receiving a token from a service provider system to enable the at least one of a plurality of organizations to access the service provider's services or information through the multi-tenant database system.

20. The method of claim 15, wherein the access credentials are maintained in an encrypted form at the hosted service system.

21. The method of claim 15, wherein after establishing an account for the service provider at a hosted service system, a service provider system creates access credentials for each organization having access to a multi-tenant database system for which the service provider provides services or information.

* * * * *